US008329062B2

(12) United States Patent
Zhang et al.

(10) Patent No.: US 8,329,062 B2
(45) Date of Patent: **\*Dec. 11, 2012**

(54) WATERPROOF MULTIPLE RARE-EARTH CO-ACTIVATED LONG-AFTERGLOW LUMINESCENT MATERIAL

(75) Inventors: Ming Zhang, Sichuan (CN); Kun Zhao, Sichuan (CN)

(73) Assignee: Sichuan Sunfor Light Co., Ltd., Chengdu (CN)

( * ) Notice: Subject to any disclaimer, the term of this patent is extended or adjusted under 35 U.S.C. 154(b) by 488 days.

This patent is subject to a terminal disclaimer.

(21) Appl. No.: 12/515,504

(22) PCT Filed: Nov. 15, 2007

(86) PCT No.: PCT/CN2007/003224
§ 371 (c)(1),
(2), (4) Date: May 19, 2009

(87) PCT Pub. No.: WO2008/061436
PCT Pub. Date: May 29, 2008

(65) Prior Publication Data
US 2010/0044633 A1     Feb. 25, 2010

(30) Foreign Application Priority Data

Nov. 20, 2006  (CN) .......................... 2006 1 0022283
Dec. 31, 2006  (CN) .......................... 2006 1 0172187

(51) Int. Cl.
| C09K 11/64 | (2006.01) |
| C09K 11/63 | (2006.01) |
| C09K 11/62 | (2006.01) |
| C09K 11/59 | (2006.01) |
| C09K 11/55 | (2006.01) |

(52) U.S. Cl. .......... 252/301.4 F; 252/301.4 R; 428/690; 106/31.64; 106/31.32

(58) Field of Classification Search .......... 252/301.4 R, 252/301.4 F; 428/690; 106/31.64, 31.32
See application file for complete search history.

(56) References Cited

U.S. PATENT DOCUMENTS

| 5,376,303 | A | 12/1994 | Royce et al. |
| 5,424,006 | A * | 6/1995 | Murayama et al. .... 252/301.4 R |
| 6,010,644 | A * | 1/2000 | Fu et al. ............... 252/301.4 R |
| 6,261,477 | B1 | 7/2001 | Fu et al. |
| 2006/0081815 | A1 | 4/2006 | Gao |
| 2008/0116420 | A1 | 5/2008 | Zhang et al. |
| 2009/0014684 | A1 | 1/2009 | Zhang et al. |

FOREIGN PATENT DOCUMENTS

| CN | 1199078 A | 11/1998 |
| CN | 1334311 A | 2/2002 |
| EP | 0877071 B1 | 1/2001 |

OTHER PUBLICATIONS

Dai et al., Abstract of CN1313376 (Sep. 19, 2001).
Murayama et al., Abstract of JP08127772 (May 21, 1996).
Murazaki et al., Abstract of JP08151573 (Jun. 11, 1996).
Murazaki et al., Abstract of JP 08151574 (Jun. 11, 1996).
Shong et al., English Translation of CN 91107337.X (Aug. 14, 1991).
International Search Report for PCT/CN2007/003224.

\* cited by examiner

*Primary Examiner* — Carol M Koslow
(74) *Attorney, Agent, or Firm* — Caesar, Rivise, Bernstein, Cohen & Pokotilow, Ltd.

(57) ABSTRACT

The present invention relates to a waterproof multiple rare-earth co-activated long-afterglow luminescent material having its general chemical composition depicted by a formula $aMO \cdot bAl_2O_3 \cdot cSiO_2 \cdot dGa_2O_3:xEu \cdot yB \cdot zN$, wherein a, b, c, d, x, y, and z are coefficients with the ranges of $0.5 \leq a \leq 2$, $0.5 \leq b \leq 3$, $0.001 \leq c \leq 1$, $0.0001 \leq d \leq 1$, $0.0001 \leq x \leq 1$, $0.0001 \leq y \leq 1$, $0.0001 \leq z \leq 1$, M is Ca or Sr, N is Dy or Nd, wherein Sr (or Ca), Al, Si, Ga are main substrate matrix elements and Eu, B, Dy (or Nd) elements are activators. The waterproof multiple rare-earth co-activated long-afterglow luminescent material according to the present invention not only has advantage of a longer afterglow time, but also has water resistance greatly superior to rare-earth activated aluminate long-afterglow luminescent material in the prior art, and still keeps higher long-afterglow property after dipping into water for 60 hours, especially shows its superiority when working or used under the environment of dipping into water or dampness.

9 Claims, 3 Drawing Sheets

WATERPROOF MULTIPLE RARE-EARTH CO-ACTIVATED LONG-AFTERGLOW LUMINESCENT MATERIAL

FIELD OF THE INVENTION

The present invention relates to a long-afterglow luminescent material, and more particularly to a multiple rare-earth co-activated long-afterglow luminescent material having excellent luminescence property and water resistance.

DESCRIPTION OF RELATED ART

The long-afterglow phenomenon is called a luminescent phenomenon in folksay, which has been found since ancient times. The famous "luminous pearl", and "luminescent wall" are just natural minerals of fluorite type, which can conserve the energy of sunlight on day and slowly emit energy in the form of luminescence at night, that is, luminescence. A long-afterglow material is a kind of material that can conserve the energy from light radiation outside such as ultraviolet light, visible light or the like, and then slowly emit the saved energy in the form of visible light at room temperature. The cause of the long-afterglow phenomenon is generally regarded as the appearance of the impurity energy level (defect energy level) due to doping. During the stage of excitation, the impurity energy level can capture vacancies or electrons. While the excitation is finished, these electrons or vacancies are released due to the heat movement which can transfer the energy to an activated ion and cause it to glow. Because the energy release is slow, luminescence of an activated ion takes on the characteristic of long-afterglow luminescence. When the trap depth is too deep, the captured electrons or vacancies won't successfully be released from the trap, which thus makes afterglow luminescence of the materials too weak. While the trap depth is too shallow, the release velocity of electrons and vacancies will be too deep, which can make the afterglow time shorten. Besides required suitable trap depth, it is also important for doped ions to have suitable affinity with electrons and vacancies in the trap. Neither too strong nor too weak affinity will prolong the afterglow.

The long-afterglow property of the materials is based on three following processes: (1) light energy outside can be conserved by the trap in the material, (2) the saved energy can be effectively transferred to luminescent ions, (3) This energy must be released by way of energy transition of luminescent ions, and not be extinct. Therefore, besides luminescent ions, other assistant activated elements play an important role in afterglow properties and characteristics of the materials.

In the prior art, there are two types as long-afterglow materials, namely sulfides denoted as ZnS:Cu and $Eu^{2+}$ activated alkaline-earth metal aluminate $MAl_2O_4$ (M denoting alkaline-earth metals). Long-afterglow luminescent materials of ZnS:Cu have already been used for several decades, but these materials have a disadvantage—relatively shorter afterglow time. To prolong the afterglow time, it is required to dope radioactive elements, for example $Pm^{147}$, Ra or the like, which would have a bad effect on the human body and environment. In addition, it can cause the following decomposing sintering: $ZnS+H_2O \rightarrow Zn+H_2S$ because of the cooperation of ultraviolet contained in sunlight and water in the air.

In recent years, compared with ZnS:Cu luminescent materials, the developed long-afterglow luminescent materials of $Eu^{2+}$ activated alkaline-earth metal aluminate (Chinese Patent Application No. 91107337.X, U.S. Pat. Nos. 5,376,303 and 5,424,006, and Japanese Patent Application Publication Numbers 8-127772, 8-151573 and 8-151574) have higher luminescent brightness, longer afterglow time, and better stability. With the development of science and technology, the higher properties of luminescent materials are required, such as water resistance. But the water resistance of long-afterglow materials in the prior art is poor. To overcome this shortcoming, the common means is to coat waterproof film on the surface of particle, but this can increase the cost of the material and can also influence the absorption and conservation of the light inevitably. On the other hand, although rare-earth long-afterglow luminescent materials of silicate substrate developed in recent years have better water resistance, luminescent brightness and afterglow property are not good.

There is a bias for a long time that boric acid is doped as fluxing agent in long-afterglow luminescent materials, also boric acid may be replaced by other fluxing agent, for example $P_2O_5$ or the like. After a great lot of experiments and researches, the inventors of the present invention find that doping boron element in long-afterglow luminescent material of alkaline-earth metal aluminate actually adjusts the trap depth of crystalloid structure of alkaline-earth metal aluminate, which is good for afterglow property and water resistance of the material.

SUMMARY OF THE INVENTION

The purpose of present invention is to provide a multiple rare-earth co-activated long-afterglow luminescent material having excellent luminescent property and water resistance.

The waterproof multiple rare-earth co-activated long-afterglow luminescent material according to the present invention has a chemical composition depicted by the formula

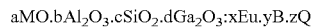
$aMO.bAl_2O_3.cSiO_2.dGa_2O_3:xEu.yB.zQ$ wherein a, b, c, d, x, y and z are coefficients (the molar ratio) having ranges of $0.5 \leq a \leq 2$, $0.5 \leq b \leq 3$, $0.001 \leq c \leq 1$, $0.0001 \leq d \leq 1$, $0.0001 \leq x \leq 1$, $0.0001 \leq y \leq 1$, $0.0001 \leq z \leq 1$; M is Ca or Sr; Q is Dy or Nd, wherein Sr (or Ca), Al, Si, Ga are main substrate matrix elements and Eu, B, Dy (or Nd) elements are activators.

The preferable above composition is:
$0.8 \leq a \leq 1.2$, $0.8 \leq b \leq 2$, $0.002 \leq c \leq 0.061$, $0.005 \leq d \leq 0.5$, $0.005 \leq x \leq 0.1$, $0.02 \leq y \leq 0.5$, and $0.005 \leq z \leq 0.05$.

The more preferable is:
$a=1$, $1 \leq b \leq 2$, $0.02 \leq c \leq 0.06$, $0.005 \leq d \leq 0.01$, $0.01 \leq x \leq 0.02$, $0.05 \leq y \leq 0.3$, $0.01 \leq z \leq 0.04$.

The most preferable is:
$a=1$, $1 \leq b \leq 2$, $0.03 \leq c \leq 0.06$, $0.005 \leq d \leq 0.01$, $0.01 \leq x \leq 0.02$, $0.05 \leq y \leq 0.2$, $0.01 \leq z \leq 0.04$.

For example:

$SrO.Al_2O_3.0.05SiO_2.0.005Ga_2O_3:$
  $0.01Eu.0.1B.0.02Dy$, Or

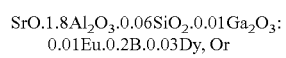
$SrO.1.8Al_2O_3.0.06SiO_2.0.01Ga_2O_3:$
  $0.01Eu.0.2B.0.03Dy$, Or

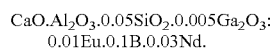
$CaO.Al_2O_3.0.05SiO_2.0.005Ga_2O_3:$
  $0.01Eu.0.1B.0.03Nd$.

Among the raw materials used in the waterproof multiple rare-earth co-activated long-afterglow luminescent material according to the present invention, the Sr or Ca elements, respectively, result from carbonates or oxides of Strontium or Calcium; Al results from oxides or hydroxides of Aluminum; the Si or Ga elements result from oxides of Silicon or Gallium; Eu, Dy, and Nd result from oxides or oxalates of Europium, Dysprosium or Neodymium; B results from oxides of Boron or Boric acid.

The present invention further provides a method of manufacturing the above waterproof multiple rare-earth co-activated long-afterglow luminescent material comprising the following steps: (1) mixing the raw materials sufficiently according to the set molar ratio, and (2) sintering the resultant mixture for 2-6 hours under 1200-1500° C. at reductive atmosphere such as CO or $H_2$ gas.

The waterproof multiple rare-earth co-activated long-afterglow luminescent material according to the present invention are obtained at a reductive atmosphere, wherein the Eu element exists in the form of a bivalence ion and its luminescence results from transition of 4f5d-4f. Because 5d electrons of $Eu^{2+}$ are easy to be effected by a substrate matrix environment, the luminescence of $Eu^{2+}$ are changed with different substrates matrix and emit visible light in the range from blue color to red color. The multiple co-activated long-afterglow luminescent materials according to the present invention can be of green, cyan, and purple long-afterglow luminescence.

The substrate matrix of long-afterglow luminescent materials according to the present invention include Si and Ga elements, water resistance of the luminescent materials can be greatly improved thereby. Furthermore, the present invention conquers technical bias, puts forward boric acid is not only used as fluxing agent, even more important, B with suitable dosage can adjust trap level depth of materials, which makes a great contribution to afterglow property. Simultaneously, use of boric acid, the surface area has been decreased prominently by sintering, which enhances water resistance of materials. So B with suitable dosage and the activator $Eu^{2+}$ and $Dy^{3+}$ or $Nd^{3+}$ used in materials can keep luminescent property of materials, at the same time, the materials can have excellent water resistance, then such conventional fluxing agent as P are unable to replace B.

The invention comprises a use of the long-afterglow luminescent materials as (1) direction identifiers for subway passengers, traffic signs, bridge identifiers, scutellate signs, border lines, walking passages, lamp posts, tunnel marks, or the like; (2) fire control and emergency escape signs; (3) ship decks, dock signs, and oil well signs, or the like; (4) special dresses, (5) aqueous coatings, paints and print inks, or the like, used, for various buildings' inner and outer wall.

In a word, by selecting the elements to be used as activators, the process of energy transfer in the materials is optimized and the efficiency of energy transfer is increased. Thereby the materials have a suitable trap and the luminescence property can be greatly improved. The materials have the excellent water resistance and its afterglow time is more than 60 hours even dipping in water. Because of the excellent luminescence properties and the water resistance, the materials can be used broadly.

Figure 1:
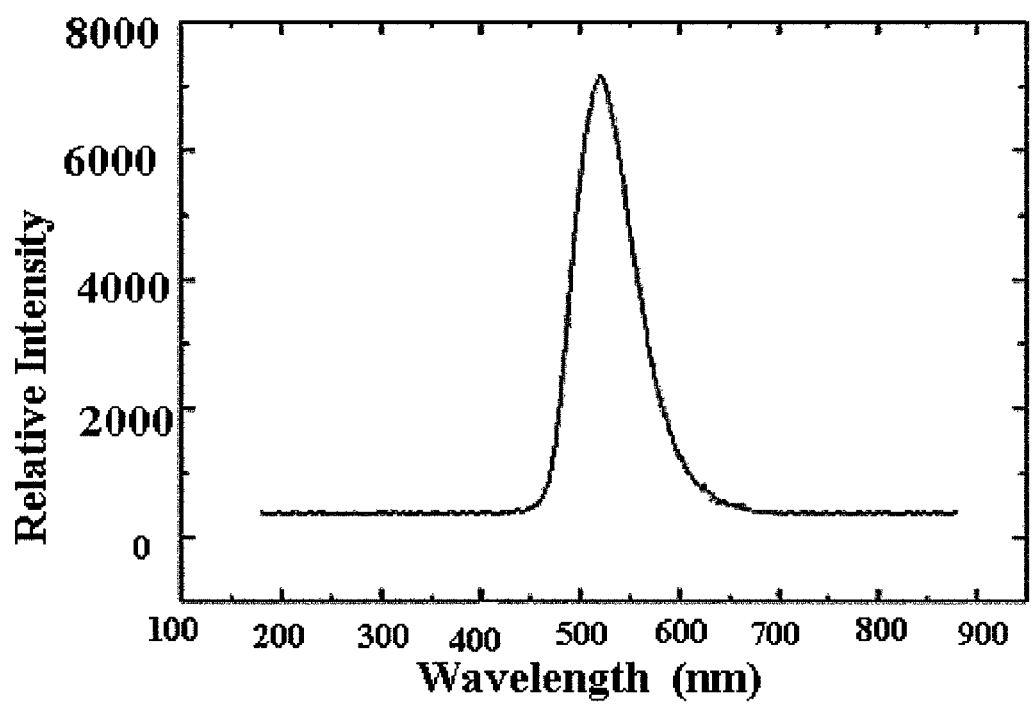
FIG. 1 shows the emission spectrum of sample 3.

The above description of the present invention is further explained in detail by means of specific embodiments in the form of examples hereinafter, however, it should not be understood that the scopes of the above subject are limited by the following examples. Any modifications and variations based on the present invention should not depart from the scopes of the present invention.

DETAILED DESCRIPTION OF EMBODIMENTS OF THE INVENTION

Examples 1-6

Preparation of Yellow-Green Long-Afterglow Luminescent Materials

The molar ratio of raw materials for examples 1-6 are listed in Table 1.

TABLE 1

| | Mole ratio of raw materials in samples (mol) | | | | | | |
|---|---|---|---|---|---|---|---|
| Samples | $SrCO_3$ | $Al_2O_3$ | $SiO_2$ | $Ga_2O_3$ | $Eu_2O_3$ | $Dy_2O_3$ | $H_3BO_3$ |
| 1 | 1 | 1 | 0 | 0 | 0.01 | 0.02 | 0 |
| 2 | 1 | 1 | 0 | 0 | 0.01 | 0.02 | 0.1 |
| 3 | 1 | 1 | 0.05 | 0.005 | 0.01 | 0.02 | 0.1 |
| 4 | 0.5 | 0.6 | 0.6 | 0.03 | 0.006 | 0.012 | 0.6 |
| 5 | 0.8 | 1.3 | 0.001 | 0.005 | 0.2 | 0.3 | 1 |
| 6 | 0.5 | 0.5 | 0.005 | 0.0001 | 0.0001 | 0.0001 | 0.0001 |

The manufacturing method is as follows:
Mixing $SrCO_3$, $Al_2O_3$, $SiO_2$, $Ga_2O_3$, $Eu_2O_3$, $Dy_2O_3$ and $H_3BO_3$ according to the molar ratio listed in Table 1 and then sufficiently grinding and mixing by ball miller, sintering for 4 hours at about 1400° C. under the mixture gas of $N_2$ and $H_2$.

For raw materials in Table 1, when $SrCO_3$, $Al_2O_3$, $Eu_2O_3$, $Dy_2O_3$, $H_3BO_3$ are respectively replaced by SrO, $Al(OH)_3$, Europium oxalate, Dysprosium oxalate, $B_2O_3$, the green rare-earth long-afterglow luminescent materials of similar properties are obtained.

Examples 7-12

Preparation of Blue-Green Long-Afterglow Luminescent Materials

The molar ratio of raw materials for examples 7-12 are listed in Table 2.

TABLE 2

| | Mole ratio of raw materials in samples (mol) | | | | | | |
|---|---|---|---|---|---|---|---|
| Samples | $SrCO_3$ | $Al_2O_3$ | $SiO_2$ | $Ga_2O_3$ | $Eu_2O_3$ | $Dy_2O_3$ | $H_3BO_3$ |
| 7 | 1 | 1.8 | 0 | 0 | 0.012 | 0.03 | 0 |
| 8 | 1 | 1.8 | 0 | 0 | 0.012 | 0.03 | 0.2 |
| 9 | 1 | 1.8 | 0.06 | 0.01 | 0.01 | 0.03 | 0.2 |
| 10 | 0.6 | 1.1 | 0.6 | 0.03 | 0.006 | 0.012 | 0.6 |
| 11 | 1.6 | 3 | 0.001 | 0.005 | 0.1 | 0.3 | 1 |
| 12 | 2 | 3 | 1 | 1 | 1 | 1 | 1 |

The manufacturing method is as follows:
Mixing $SrCO_3$, $Al_2O_3$, $SiO_2$, $Ga_2O_3$, $Eu_2O_3$, $Dy_2O_3$ and Boric Acid according to the molar ratio listed in Table 2 and then sufficiently grinding and mixing by ball miller, sintering for 6 hours at about 1400° C. under the mixture gas of $N_2$ and $H_2$.

For raw materials in Table 2, when $SrCO_3$, $Al_2O_3$, $Eu_2O_3$, $Dy_2O_3$, $H_3BO_3$ are respectively replaced by SrO, $Al(OH)_3$, Europium oxalate, Dysprosium oxalate, $B_2O_3$, the blue-green rare-earth long-afterglow luminescent materials of similar properties are obtained.

Examples 13-17

Preparation of Purple Long-Afterglow Luminescent Materials

The molar ratio of raw materials for examples 13-17 are listed in Table 3.

TABLE 3

| | Mole ratio of raw materials in samples (mol) | | | | | | |
|---|---|---|---|---|---|---|---|
| Samples | $CaCO_3$ | $Al_2O_3$ | $SiO_2$ | $Ga_2O_3$ | $Eu_2O_3$ | $Nd_2O_3$ | $H_3BO_3$ |
| 13 | 1 | 1 | 0 | 0 | 0.01 | 0.02 | 0 |
| 14 | 1 | 1 | 0 | 0 | 0.01 | 0.02 | 0.1 |
| 15 | 1 | 1 | 0.05 | 0.005 | 0.01 | 0.02 | 0.1 |
| 16 | 0.6 | 0.6 | 0.6 | 0.03 | 0.006 | 0.012 | 0.6 |
| 17 | 0.7 | 1.3 | 0.001 | 0.005 | 0.2 | 0.3 | 1 |

The manufacturing method is as follows:
Mixing $CaCO_3$, $Al_2O_3$, $SiO_2$, $Ga_2O_3$, $Eu_2O_3$, $Nd_2O_3$ and Boric Acid according to the molar ratio listed in Table 3 and then sufficiently grinding and mixing by ball miller, sintering for 2 hours at about 1400° C. under the mixture gas of $N_2$ and $H_2$.

For raw materials in Table 3, when $CaCO_3$, $Al_2O_3$, $Eu_2O_3$, $Nd_2O_3$, $H_3BO_3$ are respectively replaced by CaO, $Al(OH)_3$, Europium oxalate, Neodymium oxalate, $B_2O_3$, the purple rare-earth long-afterglow luminescent materials of similar properties are obtained.

Contrastive Examples D1-D8

TABLE 4

| | Mole ratio of raw materials in samples (mol) | | | | | | |
|---|---|---|---|---|---|---|---|
| Samples | $SrCO_3$ | $Al_2O_3$ | $SiO_2$ | $Ga_2O_3$ | $Eu_2O_3$ | $Dy_2O_3$ | $H_3BO_3$ | $NH_4H_2PO_4$ |
| D1 | 1 | 1 | 0.05 | 0.005 | 0.01 | 0.02 | 0.2 | / |
| D2 | 1 | 1 | 0.05 | 0.005 | 0.01 | 0.02 | 0.3 | / |
| D3 | 1 | 1 | 0.05 | 0.005 | 0.01 | 0.02 | / | 0.05 |
| D4 | 1 | 1 | 0.05 | 0.005 | 0.01 | 0.02 | / | 0.2 |
| D5 | 1 | 1 | 0.05 | 0.005 | 0.01 | 0.02 | / | 0.3 |
| D6 | 1 | 1 | 0.05 | 0.005 | 0.01 | 0.02 | / | 0.1 |
| D7 | 1 | 1 | 0.05 | 0.005 | 0.01 | 0.02 | / | / |

The manufacturing method is as follows:
For samples D1-D7, Mixing $SrCO_3$, $Al_2O_3$, $SiO_2$, $Ga_2O_3$, $Eu_2O_3$, $Dy_2O_3$ and Boric Acid according to the molar ratio listed in Table 4 and then sufficiently grinding and mixing by ball miller, sintering for 4 hours at about 1400° C. under the mixture gas of $N_2$ and $H_2$. The molar ratio of raw materials and the manufacturing method for sample D8 are the same as sample D7, the sintering temperature of the manufacturing method is the sole difference, whichsintering at about 1500° C.

Experimental Example 1

Figure 2:
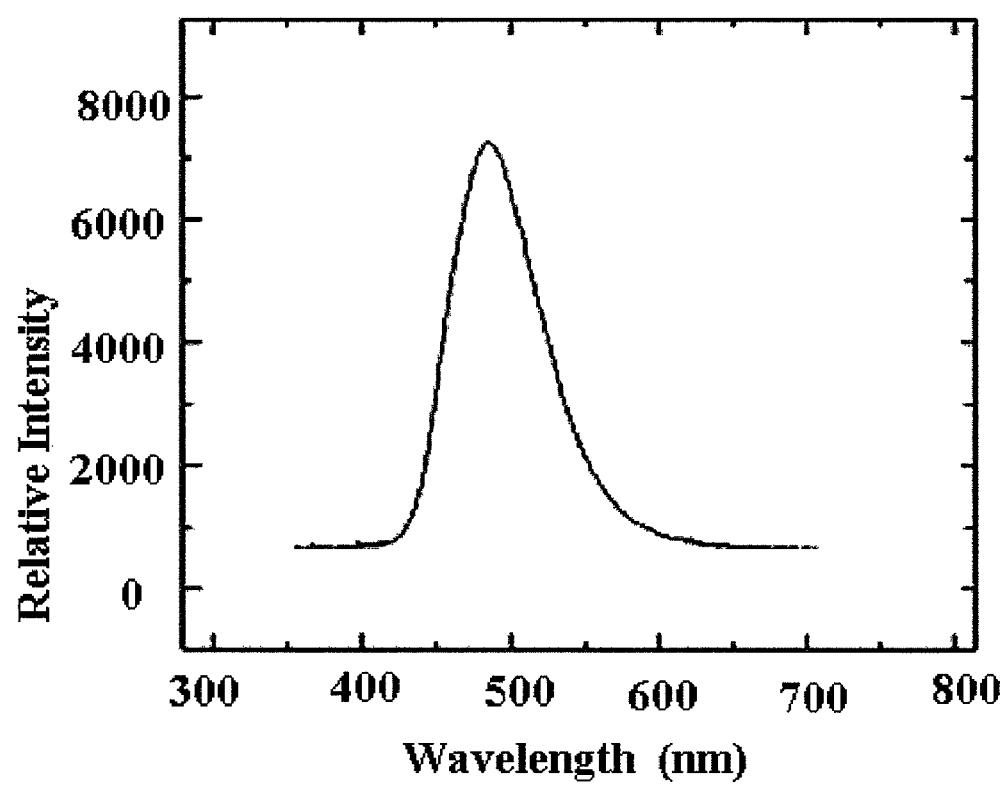
FIG. 2 shows the emission spectrum of sample 9.
Figure 3:
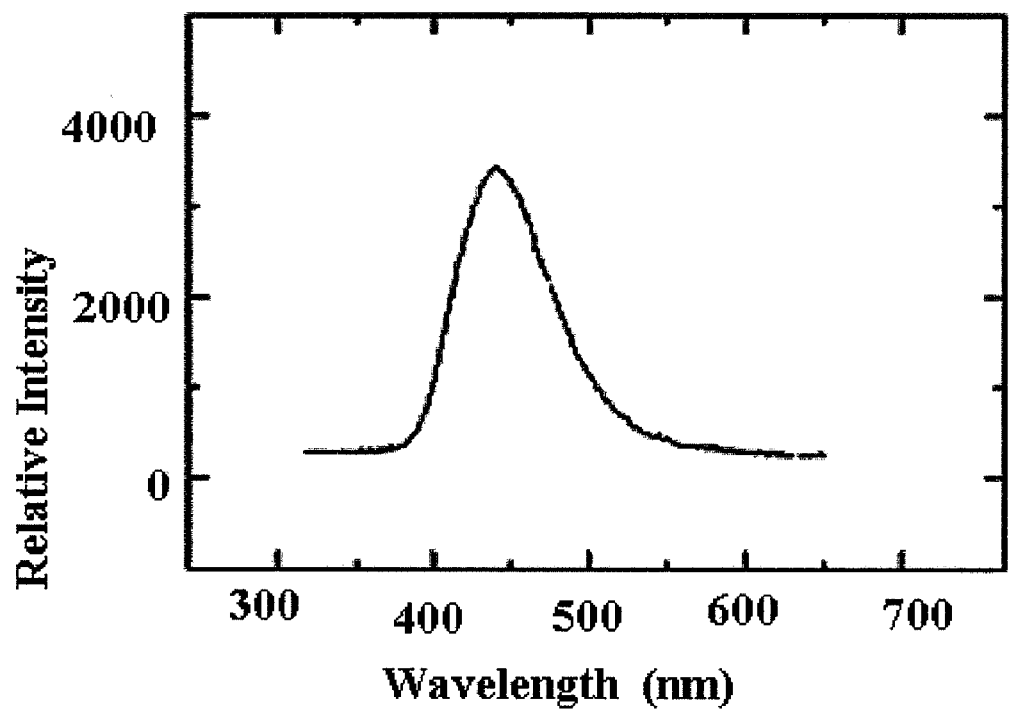
FIG. 3 shows the emission spectrum of sample 15.
Figure 4:
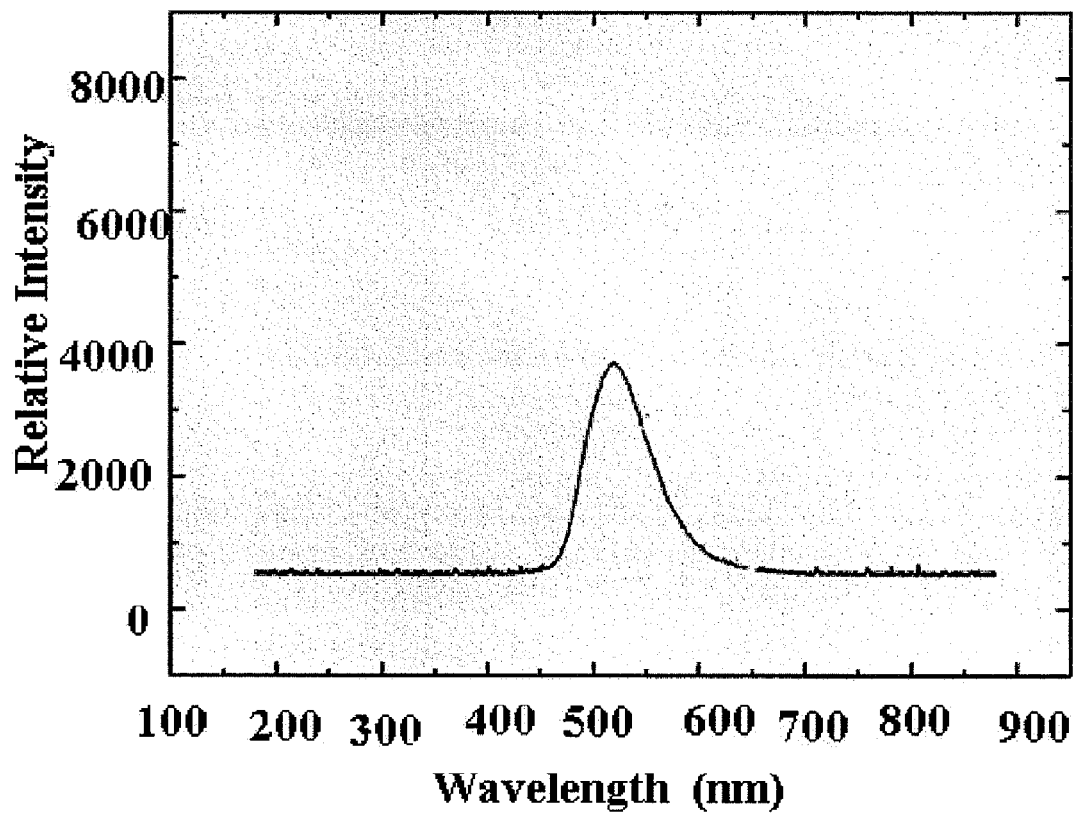
FIG. 4 shows the emission spectrum of sample D7.

The Long-Afterglow Characteristics of the Materials in the Present Invention Each sample in Table 1-3 is excited for 10 min by means of D65 normal light source, and then its afterglow persistence is measured by means of afterglow checking apparatus provided with photomultiplier, the results are respectively shown in Tables 5, 6 and 7. Sample 1 is considered as a reference value to brightness in Table 5, and sample 7 is considered as a reference value to brightness in Table 6, while sample 13 is considered as a reference value to brightness in Table 7. Sample 3 with 100 is considered as a reference value to brightness in Table 8. The afterglow curves for sample 3 is shown in FIG. 1; the afterglow curves for sample 9 is shown in FIG. 2; the afterglow curves for sample 15 is shown in FIG. 3, and the afterglow curves for sample D7 is shown in FIG. 4. FIG. 1 and FIG. 4 indicate that luminance of sample inclusive of B is stronger than one of sample exclusive of B while having the same chemical composition.

TABLE 5

| Samples | Luminance after 10 min | Luminance after 30 min | Luminance after 100 min |
|---|---|---|---|
| 1 | 1.00 | 1.00 | 1.00 |
| 2 | 14 | 20 | 22 |
| 3 | 13.8 | 21 | 23.5 |
| 4 | 6 | 12.5 | 13 |
| 5 | 2 | 3.4 | 2.5 |
| 6 | 1.8 | 3 | 3.2 |

TABLE 6

| Samples | Luminance after 10 min | Luminance after 30 min | Luminance after 100 min |
|---|---|---|---|
| 7 | 1.00 | 1.00 | 1.00 |
| 8 | 11 | 15 | 20 |

TABLE 6-continued

| Samples | Luminance after 10 min | Luminance after 30 min | Luminance after 100 min |
|---|---|---|---|
| 9 | 11.2 | 16 | 21.3 |
| 10 | 4 | 10 | 11.8 |
| 11 | 3 | 4.5 | 6 |
| 12 | 2 | 4.3 | 5.4 |

TABLE 7

| Samples | Luminance after 10 min | Luminance after 30 min | Luminance after 100 min |
|---|---|---|---|
| 13 | 1.00 | 1.00 | 1.00 |
| 14 | 10 | 12 | 13.4 |
| 15 | 10.2 | 12.3 | 14 |
| 16 | 4 | 8 | 9.4 |
| 17 | 3 | 5 | 6.3 |

TABLE 8

| Samples | Luminance after 10 min | Luminance after 30 min | Luminance after 100 min |
| --- | --- | --- | --- |
| 3 | 100 | 100 | 100 |
| D1 | 81 | 78 | 75 |
| D2 | 79 | 75 | 71 |
| D3 | 23 | 19 | 16.5 |
| D4 | 18 | 16 | 15 |
| D5 | 16 | 15 | 11.5 |
| D6 | 21 | 18 | 16 |
| D7 | 16 | 16 | 14 |
| D8 | 18 | 17 | 15 |

Sample 3 with 100 is considered as a reference value to brightness in Table 8.

Comparing sample 3 with D1-D7 in Table 8, afterglow property of sample inclusive of B is much stronger while having the same molar ratio of raw materials. Even $NH_4H_2PO_4$ is used as fluxing agent and replaces boric acid, afterglow property of such sample is much weaker than sample 3. It is obvious that afterglow property is improved after B is doped, but which is not the reason that boric acid as fluxing agent can reduce sintering temperature of sample. According to X-ray diffraction patterns of samples 3, D7, D8, peak intensity of sample 3 is stronger than sample D7 while weaker than sample D8, but afterglow brightness, decay time of sample 3 is bigger than D7, D8. The phenomena can not be explained by boric acid working as fluxing agent.

Though mechanism for long-afterglow luminescent material is not explained clearly at present, the trap energy level in the material plays a key role. While trap energy level is too shallow material can not store much energy, which results in reduction of afterglow luminescent property; while trap energy level is too deep, captured electrons by defects can not be released effectively at room temperature, which shall influence afterglow brightness and decay time of material also.

Figure 5:
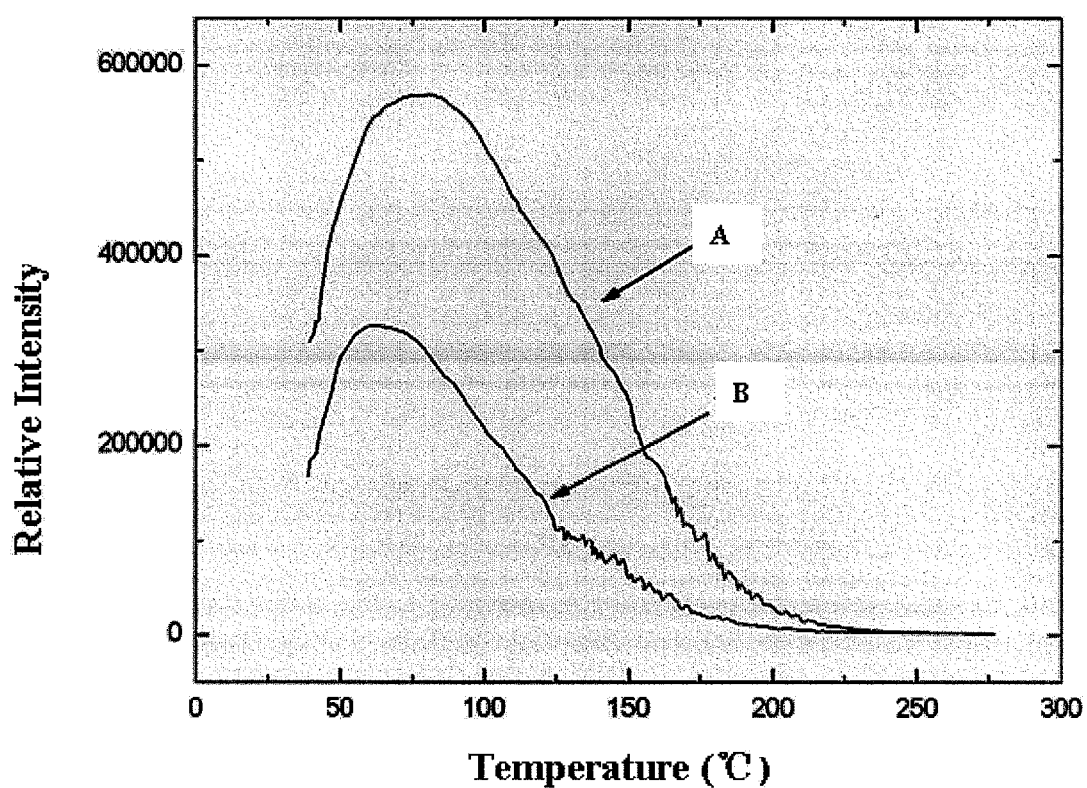
FIG. 5 shows the thermoluminescence spectrum for sample 3 and D7, wherein, A shows the thermoluminescence spectrum for sample 3, and B shows the thermoluminescence spectrum for sample D7.

At present the most usual method of studying trap energy level of long-afterglow material is thermoluminescence spectrum, namely, relation curve of temperature to luminous intensity. The trap energy level situation of long-afterglow material can be seen from peak-position of thermoluminescence spectrum: high peak-position corresponding to deep trap energy level, peak-position of low temperature corresponding to shallower trap energy level. From the thermoluminescence spectrum of the samples 3, D7 (seeing FIG. 5), it can be concluded that the peak-position of the sample inclusive of B is higher than the sample exclusive of B at the same sintering temperature☐which means trap energy level of sample inclusive of B is deeper than the sample exclusive of B. In other words, doping B to the luminescent material changes the inner defect of the luminescent material, and results in the great advance of the brightness and the life (seeing Table 8), which is the major factor that doping boric acid can greatly improve afterglow property at the lower sintering temperature. Therefore, boric acid is not only considered as fluxing agent but also one of the essential ingredients which can adjust trap energy level depth. If B element is not doped, or B is replaced by other fluxing agent, such as P, afterglow property of material is very weak.

Experimental Example 2

Water Resistance of the Materials in the Present Invention

The above long-afterglow material powder is fed into water for different times (record the dipping time), and then is dried. Each dried sample is excited for 10 minutes by means of D65 normal light source, and then its afterglow characteristic of 10 minutes after exciting is measured by means of afterglow checking apparatus provided with photomultiplier. The results of water resistance of samples in Table 1-4 are respectively shown in Table 9, 10, 11 and 12. Sample 1 is considered as a reference value to brightness in Table 9, sample 7 is considered as a reference value to brightness in Table 10, and sample 13 is considered as a reference value to brightness in Table 11, sample 3 with 100 is considered as a reference value to brightness in Table 12.

TABLE 9

| | Luminance before | Luminance after dipping into water for different times | | |
| --- | --- | --- | --- | --- |
| Samples | dipping into water | 10 h | 20 h | 60 h |
| 1 | 1.00 | 1.00 | 1.00 | 1.00 |
| 2 | 14 | 4 | 2 | 1.4 |
| 3 | 13.8 | 15 | 25.7 | 33.2 |
| 4 | 6 | 7 | 15 | 18.6 |
| 5 | 2 | 8.76 | 16.3 | 19.4 |
| 6 | 1.8 | 8 | 13.3 | 18 |

TABLE 10

| | Luminance before | Luminance after dipping into water for different times | | |
| --- | --- | --- | --- | --- |
| Samples | dipping into water | 10 h | 20 h | 60 h |
| 7 | 1.00 | 1.00 | 1.00 | 1.00 |
| 8 | 11 | 3 | 2 | 1.1 |
| 9 | 11.2 | 13 | 20.3 | 31 |
| 10 | 4 | 6.4 | 12 | 15.8 |
| 11 | 3 | 7.6 | 13.5 | 18 |
| 12 | 2 | 7.2 | 12.8 | 17.5 |

TABLE 11

| | Luminance before | Luminance after dipping into water for different times | | |
| --- | --- | --- | --- | --- |
| Samples | dipping into water | 10 h | 20 h | 60 h |
| 13 | 1.00 | 1.00 | 1.00 | 1.00 |
| 14 | 10 | 3 | 1.3 | 1.1 |
| 15 | 10.2 | 14 | 21 | 30 |
| 16 | 4 | 7 | 12 | 17.6 |
| 17 | 3 | 8.2 | 15.8 | 20 |

TABLE 12

| | Luminance before | Luminance after dipping into water for different times | | |
| --- | --- | --- | --- | --- |
| Samples | dipping into water | 10 h | 20 h | 60 h |
| 3 | 100 | 100 | 100 | 100 |
| D1 | 81 | 85 | 88 | 86 |
| D2 | 79 | 81 | 83 | 83 |
| D3 | 23 | 11 | 8 | 3 |
| D4 | 18 | 7 | 5 | 1 |
| D5 | 16 | 6 | 3 | 1 |
| D6 | 21 | 9 | 6 | 2 |
| D7 | 16 | 9 | 8 | 6 |
| D8 | 18 | 10 | 8 | 5 |

It can be observed that the density of sample inclusive of B is deeper than the sample exclusive of B.

From Table 12, water resistance of the sample exclusive of B is very weak whether P is doped as fluxing agent, the afterglow luminance after dipping into water can decrease by more than 50% than before dipping into water. Furthermore, the luminance of the sample exclusive of B is not enough to work under the circumstance of biggish humidity, and can not be used as waterproof long-afterglow material.

In fact, the long-afterglow material according to present invention with the formula of $aMO \cdot bAl_2O_3 \cdot cSiO_2 \cdot dGa_2O_3$: $xEu \cdot yB \cdot zQ$, does not mean the replacement of the elements in the simple and easy way, but is obtained after a lot of experiments. The interaction and harmonizing jointly of the Silicon, Gallium, Boron included in the substrate matrix make the material high afterglow property and water resistance. Because of the doping of Si and Ga elements, the water resistance is greatly improved. B is not only worked as fluxing agent but also the essential ingredients to adjust trap energy level depth. Simultaneously, use of boric acid can bring certain sintering phenomena, this can destroy the structure of material after being milled, which can influence luminescence property. But just this sintering phenomena can decrease surface area of material, thereby enhances water resistance of material. Hence, dosage of boric acid is a key, selecting suitable dosage can keep excellent luminescence property and water resistance of material to a great extent.

In conclusion, the waterproof multiple rare-earth co-activated long-afterglow luminescent material according to the present invention has excellent long-afterglow property, even dipping into water for 60 hours. Simultaneously, it has a broad range of applications, especially shows its superiority when working or used under the wretched environment, such as dipping into water or dampness.

What is claimed is:

1. A waterproof multiple rare-earth co-activated long-afterglow luminescent material having a chemical composition depicted by the formula $$aMO \cdot bAl_2O_3 \cdot cSiO_2 \cdot dGa_2O_3 : xEu \cdot yB \cdot zQ$$

wherein a, b, c, d, x, y and z are coefficients with the ranges of $0.5 \leq a \leq 2$, $0.5 \leq b \leq 3$, $0.001 \leq c \leq 1$, $0.0001 \leq d \leq 1$, $0.0001 \leq x \leq 1$, $0.2 \leq y \leq 1$, $0.0001 \leq z \leq 1$; M is at least one of Ca and Sr and Q is at least one of Dy and Nd.

2. The waterproof multiple rare-earth co-activated long-afterglow luminescent material according to claim 1, wherein in the chemical composition $0.8 \leq a \leq 1.2$, $0.8 \leq b \leq 2$, $0.002 \leq c \leq 0.061$, $0.005 \leq d \leq 0.5$, $0.005 \leq x \leq 0.1$, $0.2 \leq y \leq 0.5$, and $0.005 \leq z \leq 0.05$.

3. The waterproof multiple rare-earth co-activated long-afterglow luminescent material according to claim 2, wherein in the chemical composition $a=1$, $1 \leq b \leq 2$, $0.02 \leq c \leq 0.06$, $0.005 \leq d \leq 0.01$, $0.01 \leq x \leq 0.01$, $0.2 \leq y \leq 0.3$, $0.01 \leq z \leq 0.04$.

4. The waterproof multiple rare-earth co-activated long-afterglow luminescent material according to claim 3, wherein in the chemical composition $a=1$, $1 \leq b \leq 2$, $0.03 \leq c \leq 0.06$, $0.005 \leq d \leq 0.01$, $0.01 \leq x \leq 0.2$, $0.01 \leq z \leq 0.04$.

5. The waterproof multiple rare-earth co-activated long-afterglow luminescent material according to claim 4 having a chemical composition depicted by the formula $$SrO \cdot 1.8Al_2O_3 \cdot 0.06SiO_2 \cdot 0.01Ga_2O_3 : 0.01Eu \cdot 0.2B \cdot 0.03Dy.$$

6. A method for manufacturing the waterproof multiple rare-earth co-activated long-afterglow luminescent material according to claim comprising the following steps: (1) mixing raw materials sufficiently according to molar ratios of the formula, and (2) sintering a resultant mixture for 2-6 hours at 1200~1500° C. under a reductive atmosphere, whereby the material is obtained.

7. The method for manufacturing the waterproof multiple rare-earth co-activated long-afterglow luminescent material according to claim 6, wherein said reductive atmosphere is CO or $H_2$ gas.

8. A method of enhancing a luminescence of an object, said method comprising providing the object with the waterproof multiple rare-earth co-activated long-afterglow luminescent material according to claim 1, wherein the object is a member selected from the group consisting of a direction identifier for subway passengers, traffic signs, bridge identifiers, scutellate signs, border lines, walking passages, lamp posts, tunnel marks, fire control and emergency escape signs, ship decks, dock signs, and oil well signs.

9. A method of enhancing a luminescence of an object, said method comprising providing the object with the waterproof multiple rare-earth co-activated long-afterglow luminescent material according to claim 1, wherein the object is a member selected from the group consisting of dresses, aqueous inner and outer wall coatings, paints, and print inks.

* * * * *